Figure 1:
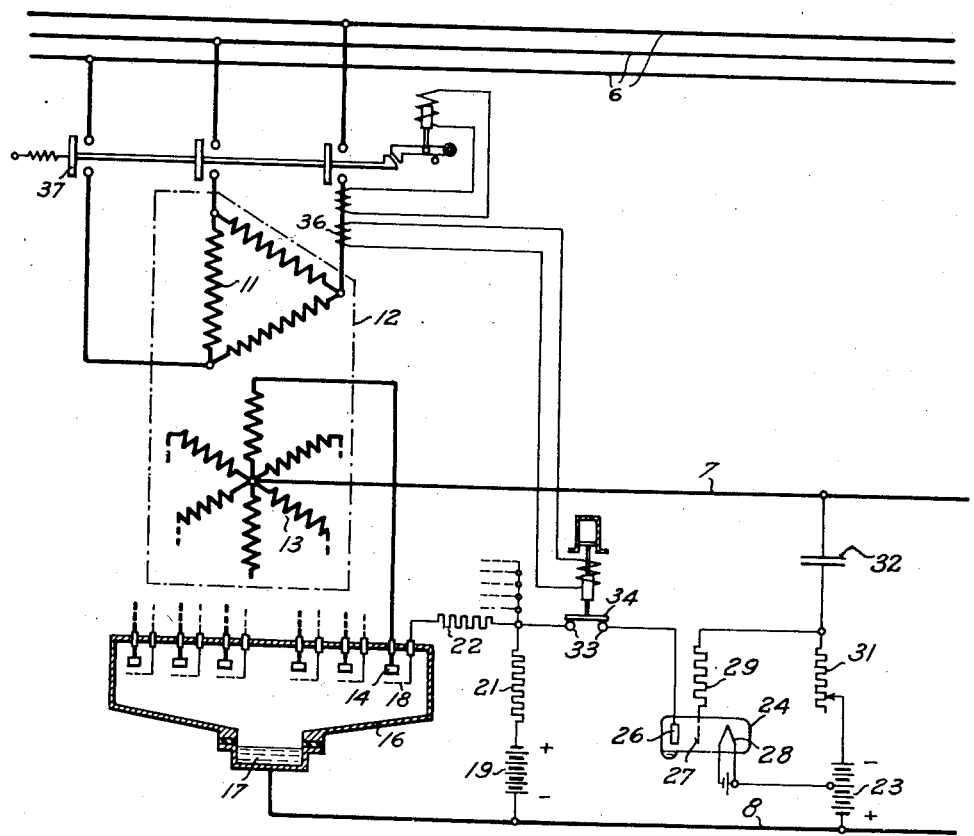

Oct. 11, 1938.  S. WIDMER ET AL  2,132,839
ELECTRIC VALVE PROTECTIVE SYSTEM
Filed March 5, 1934   3 Sheets-Sheet 1

Inventors
S. Widmer
U. Hürlimann
by
Attorney

Patented Oct. 11, 1938

2,132,839

UNITED STATES PATENT OFFICE

2,132,839
ELECTRIC VALVE PROTECTIVE SYSTEM

Stefan Widmer and Max Hürlimann, Baden, Switzerland, assignors to Aktiengesellschaft Brown Boveri & Cie., Baden, Switzerland, a joint-stock company of Switzerland Application March 5, 1934, Serial No. 714,107
In Germany March 4, 1933

19 Claims. (Cl. 175—363)

(Granted under the provisions of sec. 14, act of March 2, 1927; 357 O. G. 5)

This invention relates in general to improvements in electric valve protective systems and more particularly to static means for causing interruption of the flow of current through the electric valves upon occurrence of a disturbance in the circuits thereof.

Electric valves may be utilized in combination with suitable apparatus and circuits to form systems such as alternating current rectifying, direct current inverting, frequency converting, direct current voltage converting, or current interrupting systems. The flow of current may be controlled and regulated by suitable energization of discharge controlling means such as control electrodes. Upon occurrence of a disturbance in any such system, the flow of current is most conveniently interrupted by energizing suitable control electrodes of the valve negatively with respect to the cathode thereof. Such energization was obtained heretofore by means of mechanical devices which required an appreciable length of time for their operation whereas it is desirable to cause interruption of the flow of fault current within the shortest possible time to prevent damage to the valve and to the apparatus connected therewith. It is, therefore, preferable to utilize static means such as auxiliary electric valves which do not introduce an appreciable time delay in the operation of the protective circuits. When the valve supplies current to a direct current output line, the operation of the protective circuits is preferably initiated in response to the voltage or the current of a capacitor connected with the direct current line whereby the action of the protective members may be initiated before the disturbance has reached its full effect.

It is, therefore, one of the objects of the present invention to provide a protective system for an electric valve in which the flow of current in the valve is interrupted by the action of static means only.

Another object of the present invention is to provide a protective system for an electric valve for interrupting the flow of fault current through the valve before such current has reached its full intensity.

Another object of the present invention is to provide a protective system for an electric valve by which the flow of current through the valve may be temporarily interrupted upon occurrence of a disturbance.

Another object of the present invention is to provide a protective system for an electric valve, which system is responsive to sudden variations in the voltage of a circuit associated with the valve.

Another object of the present invention is to provide a protective system for an electric valve, which system is responsive to the occurrence of an incipient sudden discharge of a capacitor connected with the circuits of the valve.

Figure 2:
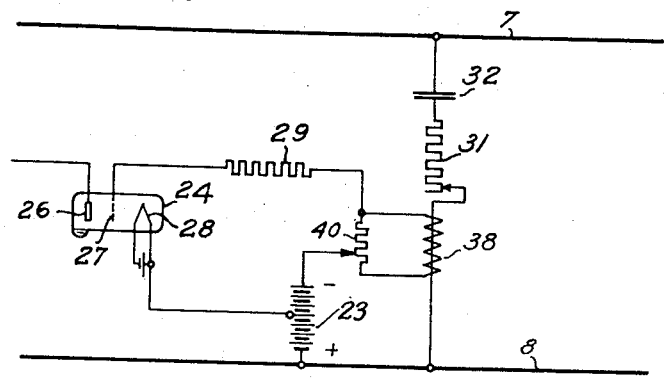
Figure 3:
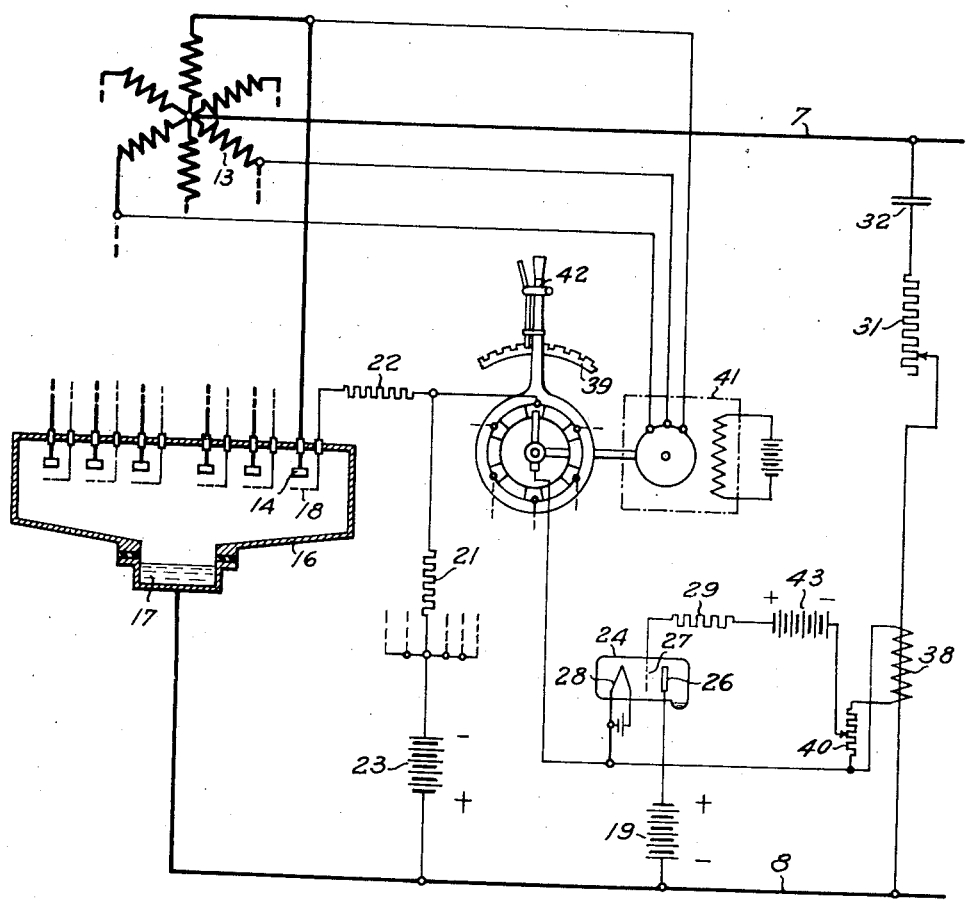
Figure 4:
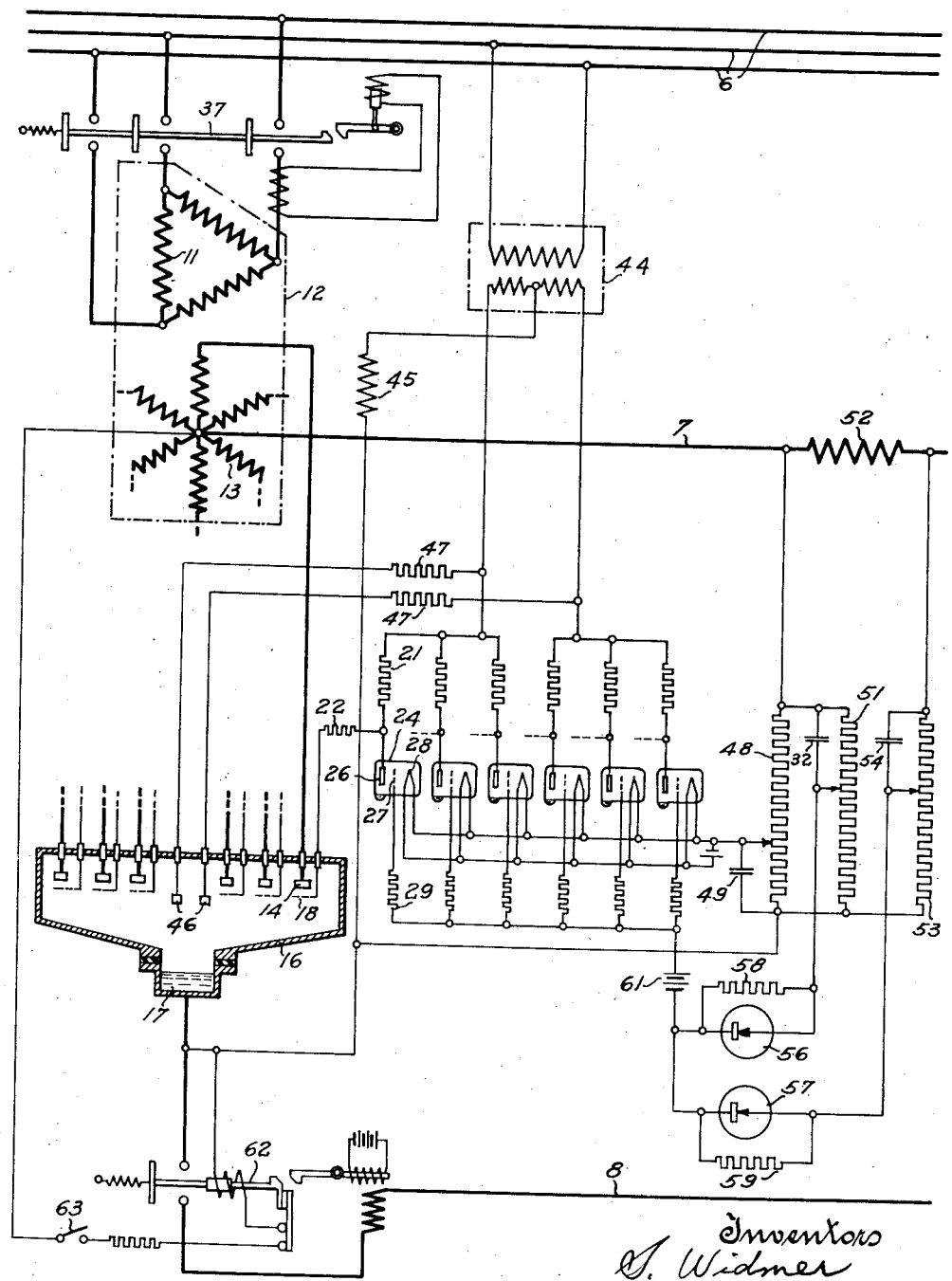

Objects and advantages other than those above described will be apparent from the following description when read in connection with the accompanying drawings, in which:

Fig. 1 diagrammatically illustrates one embodiment of the present invention applied to the control of an alternating current rectifier and responsive to the difference between the voltage of the rectifier output circuit and the terminal voltage of a capacitor connected therewith;

Fig. 2 diagrammatically illustrates a portion of a modified embodiment of the present invention differing from the embodiment illustrated in Fig. 1 in that the protective circuits are responsive to the rate of flow of current through the capacitor;

Fig. 3 diagrammatically illustrates a portion of another modified embodiment of the present invention differing from the embodiment illustrated in Fig. 2 in that means are provided for regulating the output voltage of the rectifier; and Fig. 4 diagrammatically illustrates another modified embodiment of the present invention in which the excitation system of the rectifier is utilized as a source of current for the control electrode.

Referring more particularly to the drawings by characters of reference, reference numeral 6 designates an alternating current supply line herein represented as a three phase line. A direct current line having a negative conductor 7 and a positive conductor 8 is connected with suitable current consuming devices (not shown) which in the embodiment illustrated in Fig. 1 are assumed to be incapable of returning energy to the line upon sudden decrease of the voltage thereof. Line 7, 8 receives current from line 6 through an electric translation system comprising a transformer 12 having a primary winding 11 connected, through a circuit breaker to be mentioned hereinafter, with line 6 and a secondary winding 13, and through an electric valve 16. Valve 16 is assumed to be of the vapor type having a cathode 17 connected with conductor 8 but it will be understood that the present invention is also applicable to the control of valves of other types. The valve is provided with suitable discharge igniting and maintaining means which are well known; the choice of any particular type of such means does not affect the operation of the embodiment illustrated in Fig. 1 and the means are, therefore, not shown in such figure.

Winding 13 comprises a plurality of phase displaced portions which may be connected in star to form a neutral point connected with conductor 7 and which are severally connected with the anodes as at 14 of valve 16. The flow of current through each anode of the valve is controlled by means of a control electrode such as at 18 energized by means to be described hereinafter. In the description of the several embodiments of the present invention the potential of cathode 17 will be taken as datum for the potentials of the several control electrodes of the valve and consequently any electromotive force or potential difference impressed between the cathode and the control electrode is equal in value to the potential of such control electrode. In a similar manner the potentials of the cathodes of any auxiliary valves utilized in the system will be used as datum for the potentials impressed on the associated control electrodes.

In the embodiment illustrated in Fig. 1, the control electrodes 18 of valve 16 are not utilized for regulating the output voltage of the valve during normal operation thereof and may, therefore, remain entirely unenergized during such operation. As is well known, however, to insure the normal flow of current through the valve without disturbances such as extinction of the discharge or failure of one or more anodes to carry current, it is preferable to energize the control electrodes from a source of positive potential such as a battery 19 through a current limiting resistor 21 and separate control electrode resistors as at 22. To cause interruption of the flow of current through valve 16, a source of negative potential such as a battery 23 is provided, the battery having an intermediate point thereof connected with the cathode 28 of an auxiliary valve 24, common to the entire system, having an anode 26 and a control electrode 27. Valve 24 is preferably of the vapor type and the operation of such valve and of the system will be described accordingly although it will be understood that other types of valves may be used even though resulting in a somewhat modified method of operation.

The negative terminal of battery 23 is connected with conductor 7 through a rheostat 31 and a capacitor 32, the point of junction between the rheostat and the capacitor being connected with control electrode 27 through the usual current limiting resistor 29. Anode 26 is connected with the junction point of resistors 21 and 22, such connection including the contacts 33 of a time delay relay 34 when valve 24 is of the vapor type. The coil of relay 34 is energized from a current transformer 36 inserted in the connection between winding 11 and line 6 to cause delayed opening of contacts 33 in response to flow of excessive current through current transformer 36. Winding 11 is connected with line 6 through a circuit breaker 37 provided with comparatively slow acting tripping means.

In operation, the system being connected as shown and line 6 being energized, upon closure of circuit breaker 37 the anodes of valve 16 receive phase displaced alternating voltages from winding 13 as is well known in the art. Control electrode 29 receives a negative potential from battery 23 through rheostat 31, thereby preventing the flow of current through valve 24 from batteries 23 and 19. The control electrodes of valve 16 therefore receive only a positive potential from battery 19 and insure a normal flow of current through the valve, such current being delivered to line 7, 8 at a voltage depending on the construction of transformer 12. Capacitor 32 being connected across line 7, 8 is charged at a portion of such voltage equal to the voltage of line 7, 8 minus the voltage of battery 23. The terminal voltage of capacitor 32 follows the gradual variations of the voltage of line 7, 8 resulting from the changes of load connected with line 7, 8 or from changes in the voltage of line 6; such changes result in a comparatively small flow of charging current through rheostat 31, causing an inappreciable voltage drop through such rheostat.

Upon occurrence of a disturbance such as a short circuit in line 7, 8 or a backfire within valve 16 the voltage of line 7, 8 suddenly collapses. Decrease of the voltage of line 7, 8 is, however, not immediately followed by a corresponding decrease in the voltage of capacitor 32 on account of the presence of rheostat 31. The voltage of capacitor 32 may be considered as remaining substantially constant for a short period of time so that, when the voltage of line 7, 8 has decreased by an amount equal to the voltage of the portion of battery 23 inserted between cathode 28 and control electrode 27, control electrode 27 becomes positive and releases the flow of current through valve 24. Such action therefore occurs when the voltage of line 7, 8 differs by an arbitrarily chosen amount from the operating value thereof and therefore also occurs before the fault current has reached the full value thereof resulting in the complete collapse of the line voltage. Valve 24 having become conductive, the control electrodes of valve 16 receive, from battery 23, a negative potential which overcomes the positive potential of battery 19. The anodes of the valve, with the exception of the anode carrying current at time considered therefore become inoperative and the flow of current through valve 16 ceases when the current through the operating anode falls to zero. The flow of current through valve 16 is therefore interrupted in a fraction of one cycle of the voltage in line 6 whereas such interruption would take considerably longer time by the use of mechanical means.

Following the sudden decrease in the voltage of line 7, 8 capacitor 32 slowly discharges either through the backfiring arc in valve 16 or through the fault in line 7, 8 and, after removal of the cause of disturbance by extinction of the arc or by elimination of the faulty portion of the line, capacitor 32 continues to discharge through the load connected with line 7, 8 at a rate depending mainly upon the adjustment of rheostat 31. After a period of time depending upon such adjustment the potential impressed on the control electrode 27 by capacitor 32 is again overcome by the potential of battery 23 and control electrode 27 is again negative. Valve 24 being of the vapor type, however, control electrode 27 is generally incapable of interrupting the discharge therethrough. Relay 34 is accordingly so adjusted that such relay will open the circuit of valve 24 after a sufficient length of time following initiation of the disturbance to first permit control electrode 27 to again become negative. Upon opening of contacts 33 the flow of current through valve 24 ceases and control electrode 26 regains control to prevent reestablishment of such flow of current. The valve 16 is thus returned to the normal operating condition thereof and the normal flow of current therethrough is automatically reestablished. If the control electrodes fail to interrupt the flow of current through the valve for any reason such as a defect in the system, circuit breaker 37 interrupts the flow of current after a predetermined time delay.

In the above described system, therefore, battery 19 constitutes means for impressing, on the control electrodes of valve 16, potential of sign and magnitude operative to insure a normal flow of current between lines 6 and 7, 8 by way of valve 16. Auxiliary valve 24 is operable to connect the source of negative potential 23 with the control electrodes, the control electrode 27 of valve 24 receiving from battery 23 potential of sign and magnitude operative to normally maintain valve 24 non-conductive. Capacitor 32 is connected across line 7, 8 to be charged therefrom at a predetermined portion of the voltage thereof and is connected with control electrode 27 to make valve 24 conductive upon occurrence of a disturbance causing a sudden decrease in the voltage of line 7, 8 and consequently upon suddenly occurring difference between the voltage of capacitor 32 and the quantity voltage of line 7, 8 less the voltage of battery 23. Valve 24 constitutes static means responsive to sudden variation of the voltage impressed on capacitor 32 from line 7, 8 for temporarily maintaining the control electrodes of valve 16 at potential of sign and magnitude operative to cause interruption of the flow of current through valve 16. Relay 34 constitutes time delay means responsive to the occurrence of the disturbance for momentarily opening the circuit of valve 24 whereby such valve returns to the non-conductive condition.

In the modified embodiment illustrated in Fig. 2, capacitor 32 is connected across line 7, 8 through rheostat 31 to be charged at the full line voltage. Control electrode 27 is connected with battery 23 through resistor 29 and the secondary winding of a current transformer 38 inserted between rheostat 31 and conductor 8, such connection including a voltage divider 40 if so desired.

In the present embodiment, when circuit breaker 37 is closed to cause the supply of current to line 7, 8 from line 6, control electrode 27 is again maintained at a negative potential from battery 23. Valve 16 then supplies current to line 7, 8 at the operating voltage thereof. Such voltage is suddenly impressed on capacitor 32 and rheostat 31, and capacitor 32 is charged at a rate depending upon the value of rheostat 31, the charging current of the capacitor increasing at first to afterwards decrease to zero when the charge of the capacitor is complete. The voltage appearing at the terminals of the secondary winding of the current transformer 38 is proportional to the rate of change of flow of such charging current and such voltage accordingly presents a negative half wave followed by a positive half wave of lesser magnitude, the ratio of the magnitudes of such half waves depending upon the value of rheostat 31. The negative half wave is without effect on control electrode 27 which is already negatively energized from battery 23 and rheostat 31 and voltage divider 40 are so adjusted that the following positive half wave is of insufficient magnitude for overcoming the negative voltage of battery 23. Valve 24 therefore remains non-conductive during the establishment of the flow of current through valve 16.

Upon occurrence of a disturbance such as a short circuit or backfire, the voltage of line 7, 8 suddenly decreases to a very low value and capacitor 32 suddenly begins to discharge through the point of fault or through the backfiring arc. The discharge current of capacitor 32 at first increases in value and thereafter decreases to zero when the discharge of the capacitor is complete. Current transformer 38 accordingly impresses, on control electrode 27, a positive half wave followed by a negative half wave of lesser magnitude, the positive half wave being of sufficient magnitude to overcome the potential of battery 23 and bring control electrode 27 to a positive potential releasing the flow of current through valve 24. The action of valve 24 in causing interruption of the flow of current through valve 16 is then similar to that explained above with respect to Fig. 1 and valve 24 is returned to the non-conductive position by opening of relay 34 following the return of control electrode 27 to a negative potential.

In the present embodiment therefore current transformer 38 and valve 24 operate in response to a sudden decrease in the voltage of line 7, 8 and are directly responsive to the occurrence of an incipient sudden discharge of capacitor 32 to cause the impression of the negative potential of battery 23 on the control electrodes of valve 16.

In the embodiment illustrated in Fig. 3, battery 23 is continuously connected with the control electrodes 18 through separate serial pairs of resistors as at 21 and 22. The control electrodes are also sequentially connected with battery 19 through a distributor 39 having a brush connected with cathode 28, anode 26 being connected with the positive terminal of battery 19. The brush of distributor 39 is actuated in relation with the voltage cycle of line 6 by suitable means such as a synchronous motor 41 energized from line 6 or from winding 13 and provided with suitable starting and synchronizing means (not shown). The segments of distributor 39 are preferably of such width that the flow of current through valve 24 is interrupted upon movement of the brush from one segment to the next over the intervening insulation. The timing of the energization of the several control electrodes in the cycle may be adjusted by means of a lever 42. In the present embodiment the connections of current transformer 38 with cathode 28 and control electrode 27 are reversed and comprise a source of positive bias potential such as a battery 43.

Upon closure of circuit breaker 37, motor 41 is started and brought to synchronous operating speed as is well known in the art. The control electrodes of valve 16 are generally maintained at a negative potential from battery 23 and are sequentially brought to a positive potential from battery 19 through valve 24 which is maintained in the conductive condition by energization of control electrode 27 at the potential of battery 43. The flow of current through valve 16 is accordingly established at a voltage depending upon the adjustment of lever 42. Upon impression of such voltage on line 7, 8, capacitor 32 is suddenly charged, the flow of charging current causing current transformer 38 to impress on control electrode 27 a positive half wave assisting the action of battery 43 followed by a negative half wave of lesser magnitude insufficient to offset the action of battery 43. The operation of valve 16 therefore continues, such action being regulated by manual or automatic adjustment of lever 42.

Upon occurrence of a short circuit or of a backfire, capacitor 32 suddenly discharges, the discharge thereof, when in the incipient stage, causing current transformer 38 to impress on control electrode 27 a negative half wave overcoming the action of battery 43 followed by a positive half wave of lesser magnitude at the final stage of the discharge. Rheostat 31 and voltage divider 40 are so adjusted that such negative half wave remains at a magnitude greater than the voltage of battery 43 over a time interval during which the brush of distributor 39 moves over several segments of the distributor. Such movement of the brush causes the current through valve 24 to be interrupted and control electrode 27 can, therefore, regain control to prevent further flow of current through valve 24. The connection between battery 19 and distributor 39 remains interrupted during a period of time sufficient to cause the flow of current through valve 16 to be interrupted as a result of the energization of the control electrodes of valve 16 from battery 23 only. When the voltage of battery 43 is no longer overcome by the voltage of current transformer 38, valve 24 again becomes conductive and the normal operative condition of valve 16 is reestablished.

In the present embodiment therefore battery 23 is a source of negative potential connected with cathode 17 and the control electrode 18. Battery 19 is a source of positive potential connected with cathode 17 and cooperating with valve 24 and distributor 39 for sequentially impressing on the control electrodes of valve 16 potential overcoming the potential of battery 23 and of such sign and magnitude as to be operative to release the flow of current through the anodes of the valve. Battery 43, impresses on control electrodes 27, potential of sign and magnitude operative to normally maintain valve 24 conductive while current transformer 38, voltage divider 40 and rheostat 31 connect control electrode 27 with capacitor 32 whereby valve 24 is temporarily made non-conductive and temporarily interrupts the connection between battery 19 and the control electrodes of valve 16 upon sudden decrease in the voltage of line 7, 8 and, more directly, in response to the incipient resulting sudden discharge of capacitor 32.

In the embodiment illustrated in Fig. 4 line 7, 8 is provided with a reactor 52 for smoothing the ripple of the current flowing therethrough and is assumed to either supply current to loads capable of returning energy through valve 16 upon backfiring thereof or to be connected with other generating or converting means. Battery 19 is omitted and the control electrodes of valve 16 receive alternating voltages from an excitation transformer 44 supplying current to the excitation anodes 46 of valve 16 through resistors 47 and a reactor 45. Each control electrode is connected with the proper terminal of transformer 44 to obtain positive energization of the control electrode when the flow of current is to occur through the associated anode. Control electrode 18 only is shown connected with anode 26 through resistor 22, each of the control electrodes being similarly connected with additional auxiliary valves having the cathodes and the control electrodes thereof provided with common connections. The cathodes of the auxiliary valves are connected with the movable tap of a voltage divider 48 connected between the neutral point of winding 13 and cathode 17, and are also connected with one terminal of a capacitor 49 connected with cathode 17. Capacitor 32 is connected with the neutral point of winding 13 and with the tap of a second voltage divider 51 connected in parallel with voltage divider 48. The tap of voltage divider 51 is connected with the control electrodes of the auxiliary valves through a rectifying device 56 and, if so desired, through a negative bias battery 61. Device 56 is preferably bridged by a resistor 58 of high resistance value. A third voltage divider 53 is connected between cathode 17 and with the portion of conductor 7 comprised between the reactor 52 and the load, the negative portion of such voltage divider being bridged by another capacitor 54 connected with the control electrodes of the auxiliary valves through a second rectifying device 57, a second resistor 59 and battery 61. The connection between cathode 17 and conductor 8 preferably includes a circuit breaker 62 arranged to be opened upon flow therethrough of a current of any magnitude from conductor 8 to cathode 17. Circuit breaker 62 may be caused to automatically reclose in response to the voltage between conductor 8 and cathode 17 by means of a connection therebetween comprising the closing coil of the circuit breaker and a closing switch 63.

In operation, upon closure of circuit breaker 37, a discharge being already ignited in valve 16 by the igniting means (not shown) and maintained by means of transformer 44 and anodes 46, the flow of current through the anodes of valve 16 may occur and is insured by the energization of the control electrodes of the valve from transformer 44. The auxiliary valves are all non-conductive as a result of the negative energization of the control electrodes thereof from battery 61. The normal operating output voltage of valve 16 is impressed on the closing coil circuit of circuit breaker 62 and such circuit breaker closes to complete the connection of line 7, 8 through valve 16. Capacitors 32, 49 and 54 are gradually charged through the associated voltage dividers; the taps of the voltage dividers are so adjusted that the potential impressed on the control electrodes of the auxiliary valves is slightly negative, irrespective of alternating voltages appearing at the terminals of reactor 52 as the result of the flow therethrough of alternating components of the current in line 7, 8.

Upon occurrence of a short circuit in line 7, 8, the voltage in such line collapses but the voltage across voltage divider 48 is momentarily maintained at substantially operating value by the action of reactor 52. As a result of the short circuit, the negative terminal of capacitor 54 is operatively connected with the positive terminal of capacitor 49 and the positive terminal of capacitor 54 impresses, on the control electrodes 27 through device 57, a positive potential overcoming the negative potential of battery 61. The auxiliary valves are thus made conductive and cause impression of the negative potential of the negative terminal of capacitor 49 on the control electrodes 18 of valve 16. The flow of current through valve 16 is accordingly interrupted. During such operation, the tap of voltage divider 51 is maintained at a lower potential than the tap of voltage divider 53 but a discharge of capacitor 54 into capacitor 32 is prevented by rectifying device 56. Upon interruption of the flow of current through valve 16 and removal of the short circuit fault by suitable means, the capacitors are gradually recharged at their normal voltages by the generators connected with line 7, 8 whereby the control electrodes 27 are again made negative. Each auxiliary valve being connected with a source of alternating current, that is, transformer 44, the flow of current therethrough passes through zero once per cycle and remains interrupted upon negative energization of the control electrodes to thereby reestablish the normal operation condition of valve 16. Even if no generator were connected with line 7, 8, upon complete discharge of capacitors 32, 54 and 49, the control electrodes of the auxiliary valves would return to a negative potential from battery 61. Resistors 58 and 59 are provided to complete the connection of capacitors 32 and 54 with the control electrodes of the auxiliary valves during normal operation thereof, an operative connection not being then provided by rectifying devices 56 and 57.

Upon occurrence of a backfire in valve 16, the voltage between the neutral point of winding 13 and cathode 17 collapses whereas the voltage between conductors 7 and 8 is momentarily maintained by the action of reactor 52. Capacitor 32 then provides the positive potential for the control electrodes of the auxiliary valves and the interrupting operation occurs in a manner similar to that explained above. The flow of reverse current through valve 16, which cannot be interrupted by the control electrodes, is interrupted by opening of circuit breaker 62. Upon subsequent return of the auxiliary valves to the non-conductive condition, valve 16 returns to the normal operating condition thereof and circuit breaker 62 automatically reconnects cathode 17 with conductor 8.

In the present embodiment, capacitor 49 accordingly constitutes a source of negative potential connected with cathode 17 and connected to be charged from line 7, 8 at a predetermined portion of the voltage thereof. Capacitors 32 and 54 then normally impress on the control electrodes 27 a potential lower than the potential of the cathodes 28 whereby the valves 24 cause the control electrodes 18 to receive temporarily from capacitor 49 a negative potential upon sudden decrease of the voltage of line 7, 8.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a system for controlling the flow of electric current, an electric current supply circuit, electric translation means connected with said circuit and comprising an electric valve having an anode with an associated control electrode and a cathode, an electric current output circuit connected with said translation means, and static means responsive to a sudden decrease only in the voltage of said output circuit for impressing on said control electrode a potential of sign and magnitude operative to cause interruption of the flow of current through said valve.

2. In a system for controlling the flow of electric current, an electric current supply circuit, electric translation means connected with said circuit and comprising an electric valve having an anode with an associated control electrode and a cathode, an electric current output circuit connected with said translation means, means for impressing on said control electrode potential of sign and magnitude operative to insure a normal flow of current between said circuits by way of said valve, and static means responsive to a sudden decrease only in the voltage of said output circuit for impressing on said control electrode a potential of sign and magnitude operative to cause interruption of the flow of current through said valve.

3. In a system for controlling the flow of electric current, an alternating current supply line, an electric valve connected with said line and having an anode with an associated control electrode and a cathode, a direct current output line connected with said valve, and static means responsive to a sudden decrease only in the voltage of said output line for impressing on said control electrode a potential of sign and magnitude operative to cause interruption of the flow of current through said valve.

4. In a system for controlling the flow of electric current, an alternating current supply line, an electric valve connected with said line and having an anode with an associated control electrode and a cathode, a direct current output line connected with said valve, means for impressing on said control electrode potential of sign and magnitude operative to insure a normal flow of current between said lines by way of said valve, and static means responsive to a sudden decrease only in the voltage of said output line for impressing on said control electrode a potential of sign and magnitude operative to cause interruption of the flow of current through said valve.

5. In a system for controlling the flow of electric current, an alternating current supply line, an electric valve connected with said line and having an anode with an associated control electrode and a cathode, a direct current output line connected with said valve, a capacitor connected to be charged from said direct current line, and static means responsive only to sudden discharge of said capacitor into said direct current line for impressing on said control electrode a potential of sign and magnitude operative to cause interruption of the flow of current through said valve.

6. In a system for controlling the flow of electric current, an alternating current supply line, an electric valve connected with said line and having an anode with an associated control electrode and a cathode, a direct current output line connected with said valve, a capacitor connected across said direct current line to be charged therefrom, a source of negative potential connected with said cathode, an auxiliary valve operable to connect said source with said control electrode, a control electrode for controlling the action of said auxiliary valve, means for impressing on the second said control electrode potential of sign and magnitude operative to normally maintain said auxiliary valve non-conductive, and means for connecting the second said control electrode with said capacitor whereby the second said valve is made conductive upon sudden decrease of the voltage of said direct current line.

7. In a system for controlling the flow of electric current, an alternating current supply line, an electric valve connected with said line and having an anode with an associated control electrode and a cathode, a direct current output line connected with said valve, a capacitor connected across said direct current line to be charged therefrom, a source of negative potential connected with said cathode, an auxiliary valve operable to connect said source with said control electrode, a control electrode for controlling the action of said auxiliary valve, means for impressing on the second said control electrode potential of sign and magnitude operative to normally maintain said auxiliary valve non-conductive, and means for connecting the second said control electrode with said capacitor whereby the second said valve is made conductive upon sudden decrease of the voltage of said direct current line resulting from a disturbance in the system, and time delay means responsive to the occurrence of the disturbance to momentarily open the circuit of the second said valve whereby the escond said valve returns to the non-conductive condition.

8. In a system for controlling the flow of electric current, an alternating current supply line, an electric valve connected with said line and having an anode with an associated control electrode and a cathode, a direct current output line connected with said valve, a capacitor connected across said direct current line to be charged therefrom, a source of negative potential connected with said cathode, an auxiliary valve operable to connect said source with said control electrode, a control electrode for controlling the action of said auxiliary valve, means for impressing on the second said control electrode potential of sign and magnitude operative to normally maintain said auxiliary valve non-conductive, and means for connecting the second said control electrode with said capacitor whereby the second said valve is made conductive upon the occurrence of an incipient sudden discharge of said capacitor through said direct current line.

9. In a system for controlling the flow of electric current, an alternating current supply line, an electric valve connected with said line and having an anode with an associated control electrode and a cathode, a direct current output line connected with said valve, a capacitor connected across said direct current line to be charged therefrom, a source of negative potential connected with said cathode, an auxiliary valve operable to connect said source with said control electrode, a control electrode for controlling the action of said auxiliary valve, means for impressing on the second said control electrode potential of sign and magnitude operative to normally maintain said auxiliary valve non-conductive, means for connecting the second said control electrode with said capacitor whereby the second said valve is made conductive upon the occurrence of an incipient sudden discharge of said capacitor through said direct current line resulting from a disturbance in the system, and time delay means responsive to the occurrence of the disturbance to momentarily open the circuit of the second said valve whereby the second said valve returns to the non-conductive condition.

10. In a system for controlling the flow of electric current, an alternating current supply line, an electric valve connected with said line and having an anode with an associated control electrode and a cathode, a direct current output line connected with said valve, a capacitor connected with said cathode connected to be charged from said direct current line, an auxiliary valve having an anode connected with said control electrode and having a control electrode and a cathode connected with said capacitor, a second capacitor connected with said direct current line and with the second said control electrode to impress thereon potential from said direct current line lower than the potential of the second said cathode whereby the second valve causes the first said control electrode to temporarily receive a negative potential from the first said capacitor upon sudden decrease in the voltage of said direct current line.

11. In a system for controlling the flow of electric current, an alternating current supply line, an electric valve connected with said line and having an anode with an associated control electrode and a cathode, a direct current output line connected with said valve, a source of negative potential continuously connected with said cathode and with said control electrode, a source of positive potential connected with said cathode, means for intermittently connecting the second said source with said control electrode to overcome the action of the first said source, and means responsive to a sudden decrease only in the voltage of said output line for temporarily preventing the said connection of the second said source with said control electrode.

12. In a system for controlling the flow of electric current, an alternating current supply line, an electric valve connected with said line and having an anode with an associated control electrode and a cathode, a direct current output line connected with said valve, a source of negative potential connected with said cathode and with said control electrode, a source of positive potential connected with said cathode, a capacitor connected across said direct current line to be charged therefrom, an auxiliary valve having an anode connected with the second said source and having a control electrode and a cathode connected with the first said control electrode, means for impressing on the second said control electrode potential of sign and magnitude operative to normally maintain said auxiliary valve conductive, and means for connecting the second said control electrode with said capacitor whereby the second said valve is made non-conductive upon incipient sudden discharge of said capacitor.

13. In a system for controlling the flow of electric current, an alternating current supply line, an electric valve connected with said line and having a plurality of anodes with associated control electrodes and a cathode, a direct current output line connected with said valve, a capacitor connected across said direct current line to be charged therefrom, a source of negative potential connected with said cathode and with said control electrodes, means connected with said cathode for sequentially impressing on said control electrodes potential overcoming the potential of the first said source and of sign and magnitude operative to release the flow of current sequentially through said anodes, said means comprising an auxiliary valve having an anode with an associated control electrode and a cathode, means for impressing on the second said control electrode potential of sign and magnitude operative to make said auxiliary valve conductive, and means connecting the second said control electrode with said capacitor whereby the second said valve is made non-conductive upon incipient sudden discharge of said capacitor.

14. In a system of the character described, the combination with an electric current supply circuit, an electric current load circuit, electric valve means interconnecting said circuits and comprising an element for controlling the flow of current therebetween, and a source of current for exciting said element in such sense as to render said means operable for the flow of current between said circuits, of means comprising an electric valve continuously operable during normal operation of said system to connect therethrough said source of current with said element, and means operable responsive to a sudden decrease in the voltage of said load circuit, to control the second said valve in such sense as to interrupt the connection therethrough of said source with said element.

15. In a system of the character described, the combination with an electric current supply circuit, an electric current load circuit, electric valve means interconnecting said circuits and comprising an element for controlling the flow of current therebetween, and a source of current for exciting said element in such sense as to render said means operable for the flow of current between said circuits, of means comprising an auxiliary valve continuously operable during normal operation of said system to connect said source of current with said element, a control electrode for controlling the operation of the second said valve, a source of current for exciting said control electrode in such sense as to interrupt the connection of the first said source with said element by way of the second said valve, and means operable, responsive to a sudden decrease in the voltage of said load circuit, to connect the second said source of current with said electrode.

16. In an electric current converting system, the combination with an electric current supply circuit, an electric current output circuit, and electric valve means comprising an anode and a cathode interconnecting said circuits and constituting spaced electrodes for the flow of current therebetween, of means for controlling said flow of current comprising an element of said valve means, static means responsive to a sudden decrease only in the voltage of said output circuit for impressing on the said element a potential of sign and magnitude operative to cause interruption of said flow of current, and means responsive to an abnormal condition of said system for rendering ineffective the third said means.

17. In an electric current converting system, the combination with an electric current supply circuit, an electric current output circuit, and electric valve means comprising an anode and a cathode interconnecting said circuits and constituting spaced electrodes for the flow of current therebetween, of means for controlling said flow of current comprising an element of said valve means, static means responsive to a sudden decrease only in the voltage of said output circuit for impressing on the said element a potential of sign and magnitude operative to cause interruption of said flow of current, and means responsive to flow of current of abnormal magnitude through said valve means for rendering ineffective the third said means.

18. In an electric current converting system, the combination with an electric current supply circuit, an electric current output circuit, and electric valve means comprising an anode and a cathode interconnecting said circuits and constituting spaced electrodes for the flow of current therebetween, of means for controlling said flow of current comprising an element of said valve means, static means responsive to a sudden decrease only in the voltage of said output circuit for impressing on said element a potential of sign and magnitude operative to cause interruption of said flow of current, and time delay means responsive upon the occurrence of a disturbance in the system to render the third said means momentarily ineffective.

19. In an electric current converting system, the combination with an electric current supply circuit, an electric current output circuit, and electric valve means comprising an anode and a cathode interconnecting said circuits and constituting spaced electrodes for the flow of electric current therebetween, of means for controlling said flow of current comprising an element of said valve means, means for impressing on said element a potential of such sign and magnitude as to render said valve conductive for said flow of current, static means responsive to a sudden decrease only in the voltage of said output circuit for superimposing on said element a potential of such sign and magnitude as to render said valve means non-conductive for said flow of current, and means comprising a time delay relay for rendering the fourth said means momentarily ineffective.

STEFAN WIDMER.
MAX HÜRLIMANN.